United States Patent
Flook et al.

(10) Patent No.: US 10,081,694 B2
(45) Date of Patent: *Sep. 25, 2018

(54) FUNCTIONALIZED ELASTOMER CONTAINING A BORON GROUP

(71) Applicant: The Goodyear Tire & Rubber Company, Akron, OH (US)

(72) Inventors: Margaret McGuigan Flook, Kent, OH (US); Inigo Gottker genannt Schnetmann, Constance (DE); Hannes Leicht, Constance (DE); Stefan Mecking, Constance (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,116

(22) Filed: Jul. 8, 2016

(65) Prior Publication Data

US 2017/0174811 A1 Jun. 22, 2017

Related U.S. Application Data

(63) Continuation-in-part of application No. 14/973,770, filed on Dec. 18, 2015.

(60) Provisional application No. 62/094,096, filed on Dec. 19, 2014.

(51) Int. Cl.
| | |
|---|---|
| C08F 236/06 | (2006.01) |
| C08F 236/14 | (2006.01) |
| B60C 1/00 | (2006.01) |
| C08F 230/08 | (2006.01) |
| C08F 4/619 | (2006.01) |

(52) U.S. Cl.
CPC .............. *C08F 236/06* (2013.01); *B60C 1/00* (2013.01); *B60C 1/0016* (2013.01); *C08F 230/08* (2013.01); *C08F 4/619* (2013.01); *C08F 4/61908* (2013.01)

(58) Field of Classification Search
CPC ....... B60C 1/00; B60C 1/0016; C08F 230/08; C08F 236/06; C08F 236/14; C08F 4/619; C08F 4/61908
USPC ........................................................ 526/239
See application file for complete search history.

(56) References Cited

U.S. PATENT DOCUMENTS

| | | | |
|---|---|---|---|
| 8,063,152 B2 | 11/2011 | Woloszynek et al. | |
| 8,598,286 B1 | 12/2013 | Flook | |
| 9,574,024 B1 * | 2/2017 | Flook | C08F 8/28 |
| 9,580,532 B1 * | 2/2017 | Flook | C08F 236/06 |
| 2016/0177012 A1 * | 6/2016 | McGuigan Flook | C08F 230/08 526/171 |

FOREIGN PATENT DOCUMENTS

| | | |
|---|---|---|
| EP | 2103621 A1 | 9/2009 |
| WO | 2004007602 A2 | 1/2004 |

OTHER PUBLICATIONS

Grubbs et al. (Chemoselective Construction of Substituted Conjugated Dienes Using an Olefin Cross-Metathesis Protocol, Org. Lett., vol. 7, No. 2, 2005, pp. 187-190).*
Abby R. O'Connor, et al., Polymerization of 1 3-Dienes and Styrene Catalyzed by Cationic Allyl Ni(II) Complexes, Journal of Polymer Science: Part A: Polymer Chemistry, 2010, pp. 1901-1912, vol. 48.
Abby R. O'Connor, et al., Synthesis and Reactivity of Cationic (Allyl)(arene)nickel(II) and (Allyl)(arene)palladium(II) Complexes, Organometallics, 2009, pp. 2372-2384, 28.
Abby R. O'Connor, et al., Synthesis, Characterization, and Reactivity Studies of (Cyclohexenyl)nickel(II) Complexes, Organometallics, 2010, pp. 5382-5389, 29.
Abby R. O'Connor, et al., The Mechanism of Polymerization of Butadiene by "Ligand-Free" Nickel(II) Complexes, J. Am. Chem. Soc., 2007, pp. 4142-4143, 129.

(Continued)

*Primary Examiner* — Wenwen Cai
(74) *Attorney, Agent, or Firm* — John D. DeLong

(57) ABSTRACT

The present invention is directed to a copolymer of a first monomer and a second monomer, wherein the first monomer is selected from the group consisting of 1,3-butadiene, isoprene, and styrene; and the second monomer is of formula I or V

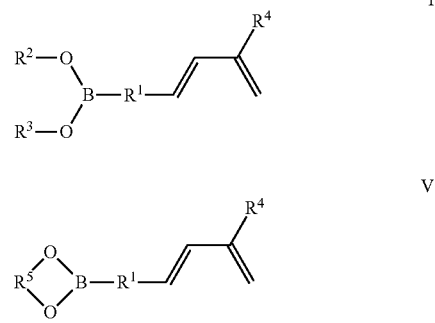

wherein $R^1$ is a covalent bond, phenylene, a linear or branched alkane diyl group containing 1 to 10 carbon atoms, or a combination of one or more phenylene groups and one or more linear or branched alkane diyl groups containing 1 to 10 carbon atoms; $R^2$ and $R^3$ are independently linear or branched alkyl groups containing 1 to 10 carbon atoms; $R^4$ is hydrogen or a linear or branched alkyl group containing 1 to 10 carbon atoms; and $R^5$ is a linear or branched alkane diyl group containing 1 to 20 carbon atoms, or a bridging aromatic group. The invention is further directed to a rubber composition including the copolymer, and a pneumatic tire containing the rubber composition. The invention is further directed to a method of making such a copolymer.

13 Claims, No Drawings

(56) References Cited

OTHER PUBLICATIONS

European Search Report dated Feb. 23, 2017 for Application Serial No. EP16202855.
Welker, et al.: "Recent Advances in Syntheses and Reaction Chemistry of Boron and Silicon Substituted 1,3-Dienes," Tetrahedron, Elsevier Science Publishers, vol. 64, No. 51, Dec. 15, 2008.

* cited by examiner

FUNCTIONALIZED ELASTOMER CONTAINING A BORON GROUP

BACKGROUND

Stereoregular diene polymers are produced and used industrially on a large scale as an important component of tire compounds. Diene polymers with high levels of stereoregularity are almost exclusively prepared with coordination polymerization catalysts, which are in general easily poisoned by polar functionalities. Because of this poisoning effect, the types of monomers that are compatible with coordination catalysts are usually limited to simple hydrocarbons. It is well known within the tire industry that the incorporation of even low levels of functionality into certain tire polymers (prepared through anionic or emulsion polymerization) significantly improves the performance of tires containing such polymers. Unfortunately, there is currently no reliable method to apply this functionalization technology to stereoregular diene polymers, but it is likely that such a polymer would show superior tire properties over known unfunctionalized polymers.

EP189174 discloses polymerization and copolymerization of 2-alkoxysilyl-1,3-butadiene monomers.

WO2004/007602 discloses a catalyst for the polymerization of 1,4-dienes, styrene and for the copolymerization of two monomers. The characteristics of the inventive catalyst include a high degree of stereoselectivity, catalytic activity and tolerance to the presence of polar impurities. Said catalyst combines the characteristics specific to Ni-based diene polymerization catalysts (high stereoselectivity and catalytic activity) with a well-defined character and tolerance to the presence of polar substances.

Sunada et al. (*Journal of Applied Polymer Science*, Vol. 97, 1545-1552 (2005) disclose triethoxysilyl-modified polychloroprene (CR) latex synthesized by the emulsion copolymerization of 2-(3-triethoxysilylpropyl)-1,3-butadiene with chloroprene.

U.S. Pat. No. 8,063,152 discloses functionalizing agents that are particularly useful for functionalizing living rubbery polymers to make the polymer more compatible with fillers, such as carbon black and silica. These functionalizing agents are comprised of a boron containing compound having a structural formula selected from the group consisting of:

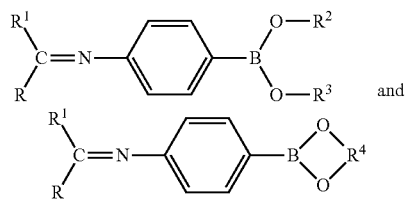

and wherein R is selected from the group consisting of hydrogen atoms, alkyl groups and aryl groups, wherein $R^1$, $R^2$, and $R^3$ can be the same or different and are selected from the group consisting of alkyl groups, and aryl groups, and wherein $R^4$ represents an alkylene group or a bridging aromatic group.

SUMMARY

The present invention is directed to a copolymer of a first monomer and a second monomer, wherein the first monomer is selected from the group consisting of 1,3-butadiene, isoprene, and styrene; and the second monomer is of formula I or V

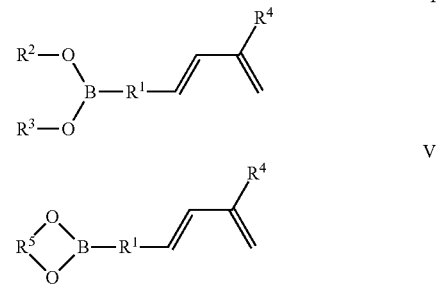

wherein $R^1$ is a covalent bond, phenylene, a linear or branched alkane diyl group containing 1 to 10 carbon atoms, or a combination of one or more phenylene groups and one or more linear or branched alkane diyl groups containing 1 to 10 carbon atoms; $R^2$ and $R^3$ are independently linear or branched alkyl groups containing 1 to 10 carbon atoms; $R^4$ is hydrogen or a linear or branched alkyl group containing 1 to 10 carbon atoms; and $R^5$ is a linear or branched alkane diyl group containing 1 to 20 carbon atoms, or a bridging aromatic group.

The invention is further directed to a rubber composition including the copolymer, and a pneumatic tire containing the rubber composition.

The invention is further directed to a method of making such a copolymer.

DESCRIPTION

There is disclosed a copolymer of a first monomer and a second monomer, wherein the first monomer is selected from the group consisting of 1,3-butadiene, isoprene, and styrene; and the second monomer is of formula I or V

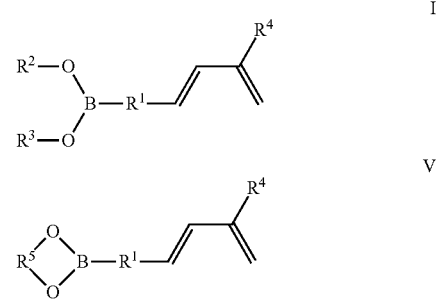

wherein $R^1$ is a covalent bond, phenylene, a linear or branched alkane diyl group containing 1 to 10 carbon atoms, or a combination of one or more phenylene groups and one or more linear or branched alkane diyl groups containing 1 to 10 carbon atoms; $R^2$ and $R^3$ are independently linear or branched alkyl groups containing 1 to 10 carbon atoms; $R^4$ is hydrogen or a linear or branched alkyl group containing 1 to 10 carbon atoms; and $R^5$ is a linear or branched alkane diyl group containing 1 to 20 carbon atoms, or a bridging aromatic group.

There is further disclosed a rubber composition including the copolymer, and a pneumatic tire containing the rubber composition.

There is further disclosed a method of making such a copolymer.

The copolymer is produced via polymerization of a first, nonfunctionalized monomer and a second, functionalized diene monomer.

In one embodiment, the first monomer is 1,3-butadiene, isoprene, or styrene.

In one embodiment, the second monomer is a monomer of formula I or V

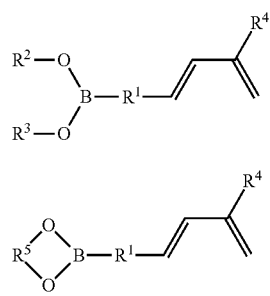

wherein $R^1$ is a covalent bond, phenylene, a linear or branched alkane diyl group containing 1 to 10 carbon atoms, or a combination of one or more phenylene groups and one or more linear or branched alkane diyl groups containing 1 to 10 carbon atoms; $R^2$ and $R^3$ are independently linear or branched alkyl groups containing 1 to 10 carbon atoms; $R^4$ is hydrogen or a linear or branched alkyl group containing 1 to 10 carbon atoms; and $R^5$ is a linear or branched alkane diyl group containing 1 to 20 carbon atoms, or a bridging aromatic group.

In one embodiment, the first monomer is 1,3-butadiene or isoprene.

In one embodiment, $R^1$ is a covalent bond and the second monomer is a monomer of formula Ia or Va

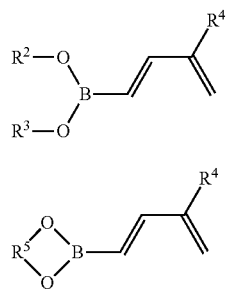

$R^2$ and $R^3$ are independently linear or branched alkyl groups containing 1 to 10 carbon atoms; $R^4$ is hydrogen or a linear or branched alkyl group containing 1 to 10 carbon atoms; and $R^5$ is a linear or branched alkane diyl group containing 1 to 20 carbon atoms, or a bridging aromatic group.

In one embodiment, bridging aromatic group is selected from one of the following structures:

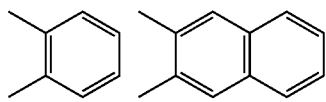

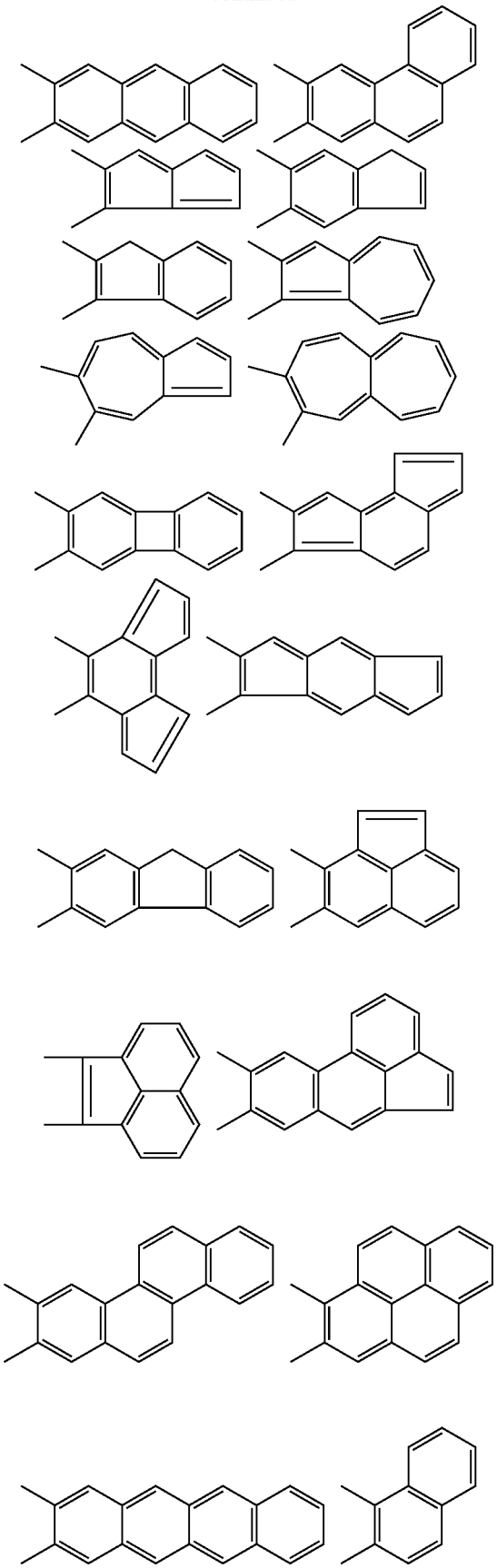

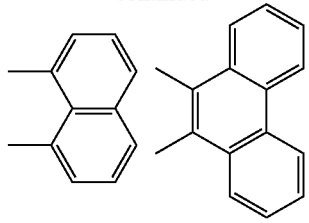

The copolymer has a high degree of stereoregularity. In one embodiment, the copolymer has a cis 1,4 microstructure content of greater than 80 percent by weight based on the polybutadiene content of the copolymer. In one embodiment, the copolymer has a cis 1,4 microstructure content of greater than 95 percent by weight based on the polybutadiene content of the copolymer.

The copolymer has a major weight portion attributed to units derived from the nonfunctionalized monomer, and a minor weight portion attributed to units derived from the functionalized monomer. In one embodiment, the copolymer comprises from 0.1 to 40 percent by weight of units derived from the functionalized diene monomer. In one embodiment, the copolymer comprises from 0.5 to 20 percent by weight of units derived from the functionalized diene monomer. In one embodiment, the copolymer comprises from 1 to 5 percent by weight of units derived from the functionalized diene monomer.

The copolymer is produced by polymerization of the first monomer and second monomer in the presence of a nickel coordination catalyst. In one embodiment, the catalyst is an (allyl)(arene)Ni(II) compound. Suitable (allyl)(arene)Ni(II) compounds may be produced as described in O'Connor et al. (*Organometallics* 2009, 28 2372-2384). The catalyst is generally in the form of a cation with a suitable counteranion. In one embodiment, the counteranion is tetrakis(3,5-bis(tifluoromethyl)phenyl) borate (i.e. $BAr^F_4{}^-$). In one embodiment, the catalyst is the (allyl)(mesitylene)Ni(II)$^+$ $BAr^F_4{}^-$ complex as shown in formula II

II

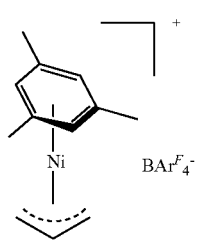

The polymerization using the (allyl)(arene)Ni(II) catalysts may be done following the methods as described in O'Connor et al. (*Journal of Applied Polymer Science, Part A: Polymer Chemistry*, Vol. 48, 1901-1912 (2010)). The copolymerization may be carried out by solution polymerization at a temperature ranging from 0 to 60° C. Suitable solvents for the solution polymerization include toluene, methylene chloride, and heptane, and the like.

The copolymer may be compounded into a rubber composition.

The rubber composition may optionally include, in addition to the functionalized copolymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include silica, carbon black, or a combination of silica and carbon black.

The rubber composition may include from about 1 to about 150 phr of silica. In another embodiment, from 10 to 100 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

Commonly employed carbon blacks can be used as a conventional filler in combination with silica in an amount ranging from 1 to 150 phr. In another embodiment, from 10 to 100 phr of carbon black may be used. Although carbon black may be used with silica, in one embodiment, essentially no carbon black is used except for an amount required to impart black color to the tire which is from 1 to 10 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3/100$ g.

Combinations of silica and carbon black may be used in the composition. In one embodiment, the weight ratio of silica to carbon black is greater than or equal to one.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

Synthesis of the Ni catalyst II is described in literature (O'Connor et al. *Organometallics* 2009, 28 2372-2384). Alternatively, a mixture of this complex with Mg-salts and excess NaBAr$^F_4$ can be generated by following the outlined procedure of example 2.

Example 2

In this example, the synthesis of a Ni(II) coordination catalyst is illustrated. The compound of formula III was converted to the compound of formula II as follows. Compound III (8 mmol) was combined with NaBAr$^F_4$ (8 mmol) and mesitylene (20 mmol) in 40 ml of diethyl ether in a 100 ml Schlenk tube and cooled −78 C. After 5 minutes, 8 ml of 1 M allyl magnesium bromide in diethyl ether was dropwise added under stirring, and the temperature increased to −20 C by exchange of the cooling bath after the addition of allyl magnesium bromide was complete. After 60 minutes at −20 C, the cooling bath was removed and the mixture warmed to 25 C at which the ether was distilled off at 25 C to leave a crude solid. Methylene chloride (30 ml) was then added and the mixture was agitated, followed by filtration of the solids. Heptane (10 mL) was added to the methylene chloride solution and the resulting mixture concentrated to dryness under high vacuum to leave 6.85 g of solids containing about 50% yield of the catalyst II based on Ni.

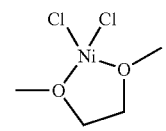

III

-continued

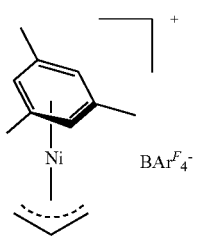

II

Example 3

In the following example, the copolymerization of 1,3 butadiene with (E)-4,4,5,5-tetramethyl-2-(3-methylbuta-1,3-dien-1-yl)-1,3,2-dioxaborolane (formula IV) is illustrated.

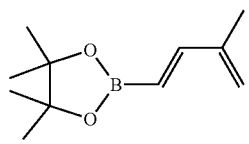

IV (E)-4,4,5,5-tetramethyl-2-(3-methylbuta-1,3-dien-1-yl)-1,3,2-dioxaborolane

The functional monomer (E)-4,4,5,5-tetramethyl-2-(3-methylbuta-1,3-dien-1-yl)-1,3,2-dioxaborolane may be synthesized following methods as described in Chemistry—A European Journal (2013), 19, (28), 9127-9131. Alternatively, (E)-4,4,5,5-tetramethyl-2-(3-methylbuta-1,3-dien-1-yl)-1,3,2-dioxaborolane can be synthesized in optimized yield by the following procedure Synthesis of 2-methylbut-1-en-3-yne

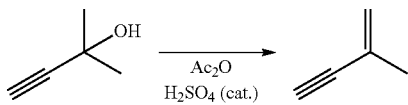

According to Defranq, E.; Zesiger, T.; Tabacchi, R. *Helv. Chim. Acta* 1993, 76, 425-430: 215 g 2-methyl-3-yn-2-ol (2.5 mol, 1 equiv.) were filled into a 1 L three-necked flask, equipped with a dropping funnel and a distillation apparatus. The receiver flask was cooled to −78° C. 319 g acetic anhydride (3.13 mol, 1.25 equiv.) and 12 g sulfuric acid (0.12 mol, 0.05 equiv.) were filled into the dropping funnel and added dropwise over 2 hours starting at 50° C. After addition of 50 mL the temperature was increased to 70° C. and distillation of the product began (bp.: 33° C./1 atm). After complete addition the temperature was increased to 80° C. The product was washed with ice water to remove residues of acetic acid and alcohol and dried with sodium sulfate.

Yield: 55% (90 g, 1.36 mol, related to 2-methyl-3-yn-2-ol), clear liquid

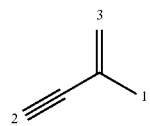

$^1$H NMR (400 MHz, 25° C., CDCl$_3$): δ5.38 (m, 1H, H-3), 5.29 (m, 1H, H-3), 2.86 (s, 1H, H-2), 1.90 (t, $^4J_{1-3}$=1.3 Hz, 3H, H-1).

Synthesis of (E)-4,4,5,5-tetramethyl-2-(3-methylbuta-1,3-dien-1-yl)-1,3,2-dioxaborolane

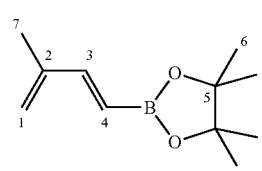

In analogy to a procedure published by Hoveyda et al. hydroborylation of 2-methylbut-1-en-3-yne was accomplished under copper catalysis (Lee, Y.; Jong, H.; Hoveyda, A. H. *J. Am. Chem. Soc.* 2009, 131, 18234-18235): 3.8 g (30 mmol, 1 equiv.) pinacolborane, 2.2 g 2-methylbut-1-en-3-yne (33 mmol, 1.1 equiv), 4 mg (10 μmol, 0.3 mol %) 1,3-(2,6-di-isopropyl-phenyl)imidazolidin-2-ylidene)copper (I) chloride and 8 mg (13 μmol, 0.4 mol %) lithium tert-butoxide were stirred under exclusion of water and oxygen for 2 days. The volatiles were removed in vacuum and the residue purified via bulb to bulb distillation.

Yield: quantitative

IV $^1$H NMR (400 MHz, 25° C., C$_6$D$_6$): δ=7.47 (d, $^3J_{4-3}$=18 Hz, 1H, H4), 5.82 (dt, $^3J_{3-4}$=18 Hz, $^4J_{3-1}$=0.5 Hz, 1H, H3), 4.90-5.05 (m, 2H, H1), 1.68 (m, 3H, H7), 1.09 (m, 12H, H6)

$^{13}$C NMR (400 MHz, 25° C., C$_6$D$_6$): δ=152.7 (C3), 143.4 (C2), 120.0 (C1), 117.2 (b, C4), 83.1 (C5), 24.9 (C6), 17.7 (C7).

Example 4

In this example, the copolymerization of 1,3 butadiene with the monomer of formula IV is illustrated. Polymerizations were done to produce four copolymer samples, as indicated in Table 1.

The functional monomer of formula IV was synthesized as described in Example 3.

The monomer of formula IV was added to a flame-dried schlenk-flask as toluene solution (total volume of toluene 15 mL for example 1-3, and 35 mL for example 4) and the flask was subsequently sealed with a rubber septum. Butadiene was added, either by condensation into the toluene at −78° C. (samples 1-3) or by saturation of the toluene at the reaction temperature (sample 4). The polymerization was initiated by adding the catalyst in toluene (5 mL) at the indicated reaction temperature. The polymerization was allowed to run at that temperature for the indicated time. 0.5 mL of $NEt_3$ were added to end the polymerization. Residual butadiene was carefully removed under reduced pressure and the polymer was precipitated in MeOH in the presence of BHT (ca. 100 mg/100 mL). The formed polymer was dried overnight at 50° C. under reduced pressure to give the indicated yield g of poly(butadiene-co-(E)-4,4,5,5-tetramethyl-2-(3-methylbuta-1,3-dien-1-yl)-1,3,2-dioxaborolane). Samples were analyzed with results given in Table 1. Molecular weight Mn and polydispersity (PDI) were measured using GPC in THF vs. polystyrene standards. Glass transition temperature Tg was measured using DSC. The microstructure of the polymer was determined by NMR-analyses ($^1H$ and $^{13}C$).

|  | Sample No. | | | |
| --- | --- | --- | --- | --- |
|  | 1 | 2 | 3 | 4 |
| amount of catalyst[1], μmol | 10 + 10 | 10 | 10 + 15 | 6 |
| temperature, ° C. | 0 | r.t. | r.t. | 0 |
| time, hr | 1 | 1 | 5.5 | 4 |
| butadiene, g | 9.1 | 10.3 | 9.0 | 1.05 Bar |
| comonomer of formula IV, mmol | 0.52 | 2.06 | 5.18 | 0.43 |
| yield, g | 5.7 | 4.9 | 7.7 | 13.2 |
| comonomer incorporation, mol % | 0.43 | 1.85 | 3.6 | 0.175 |
| comonomer conversion, % | 87 | 81 | 99 | 99 |
| $M_n$, $10^3$ g/mol | 65 | 37 | 25 | 140 |
| PDI | 2.6 | 2.4 | 2 | 1.9 |
| $T_g$, ° C. | −97 | −95 | −92 | −96 |
| Microstructure, % 1,4 cis | 96 | 96 | 95 | 96 |

[1]Catalyst was added in two aliquots in samples 1 and 3 as indicated

What is claimed is:

1. A copolymer of a first monomer and a second monomer, wherein the first monomer is selected from the group consisting of 1,3-butadiene, isoprene, and styrene; and the second monomer is of formula I or V

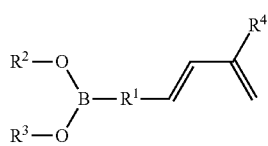

I

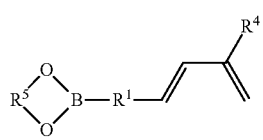

V wherein $R^1$ is a covalent bond, phenylene, a linear or branched alkane diyl group containing 1 to 10 carbon atoms, or a combination of one or more phenylene groups and one or more linear or branched alkane diyl groups containing 1 to 10 carbon atoms; $R^2$ and $R^3$ are independently linear or branched alkyl groups containing 1 to 10 carbon atoms; $R^4$ is hydrogen or a linear or branched alkyl group containing 1 to 10 carbon atoms; and $R^5$ is a linear or branched alkane diyl group containing 1 to 20 carbon atoms, or a bridging aromatic group.

2. The copolymer of claim 1, comprising from 0.1 to 40 percent by weight of units derived from the second monomer based on the weight of the copolymer.

3. The copolymer of claim 1, comprising from 0.5 to 20 percent by weight of units derived from the second monomer of based on the weight of the copolymer.

4. The copolymer of claim 1, comprising from 1 to 5 percent by weight of units derived from the second monomer based on the weight of the copolymer.

5. The copolymer of claim 1, where $R^1$ is a covalent bond and the second monomer is a monomer of formula Ia or Va

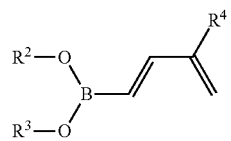

Ia

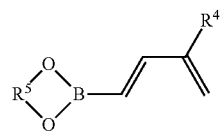

Va $R^2$ and $R^3$ are independently linear or branched alkyl groups containing 1 to 10 carbon atoms; $R^4$ is hydrogen or a linear or branched alkyl group containing 1 to 10 carbon atoms; and $R^5$ is a linear or branched alkane diyl group containing 1 to 20 carbon atoms, or a bridging aromatic group.

6. The copolymer of claim 1, wherein the second monomer has the structure:

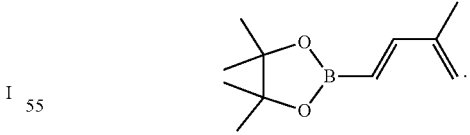

7. A rubber composition comprising the copolymer of claim 1.

8. A pneumatic tire comprising the rubber composition of claim 7.

9. A method of making a copolymer of a first monomer and a second monomer, wherein the first monomer is selected from the group consisting of 1,3-butadiene, isoprene, and styrene; and the second monomer is of formula I or V

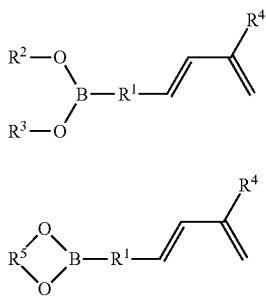

wherein R¹ is a covalent bond, phenylene, a linear or branched alkane diyl group containing 1 to 10 carbon atoms, or a combination of one or more phenylene groups and one or more linear or branched alkane diyl groups containing 1 to 10 carbon atoms; R² and R³ are independently linear or branched alkyl groups containing 1 to 10 carbon atoms; R⁴ is hydrogen or a linear or branched alkyl group containing 1 to 10 carbon atoms; and R⁵ is a linear or branched alkane diyl group containing 1 to 20 carbon atoms, or a bridging aromatic group.

10. The method of claim 9, where the monomer of formula V has the structure:

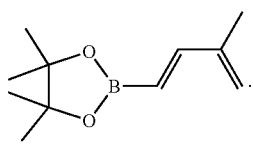

11. The method of claim 9, where R¹ is a covalent bond and the second monomer is a monomer of formula Ia or Va

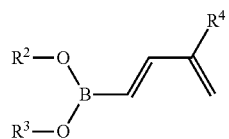

R² and R³ are independently linear or branched alkyl groups containing 1 to 10 carbon atoms; R⁴ is hydrogen or a linear or branched alkyl group containing 1 to 10 carbon atoms; and R⁵ is a linear or branched alkane diyl group containing 1 to 20 carbon atoms, or a bridging aromatic group.

12. The method of claim 9 wherein the polymerization is done in the present of a catalyst is of formula II

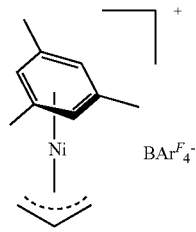

where $BAr^F_4{}^-$ is tetrakis(3,5-bis(trifluoromethyl)phenyl) borate.

13. The method of claim 9, wherein the bridging aromatic group is selected from the group consisting of the following structures:

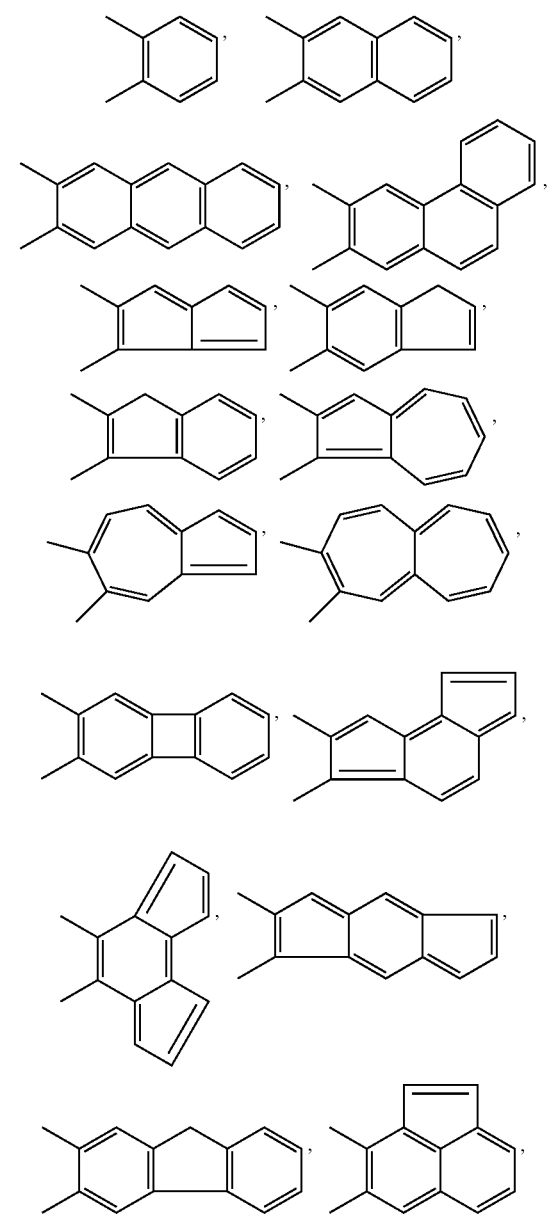

-continued
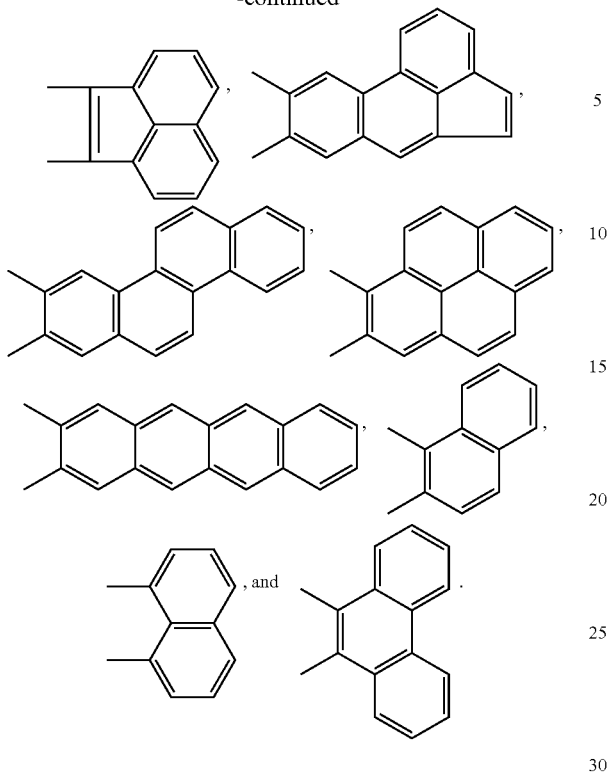
* * * * *